Aug. 28, 1928.

J. L. BRETON 1,682,063

DISH WASHING AND DRYING MACHINE

Filed March 24, 1925     2 Sheets-Sheet 1

Inventor:
Jules-Louis Breton
By
Attorney.

Aug. 28, 1928.  
J. L. BRETON  
1,682,063  
DISH WASHING AND DRYING MACHINE  
Filed March 24, 1925    2 Sheets-Sheet 2

Inventor:  
Jules-Louis Breton  
By _____  
Attorney

Patented Aug. 28, 1928.

1,682,063

UNITED STATES PATENT OFFICE.

JULES-LOUIS BRETON, OF BELLEVUE, FRANCE.

DISH WASHING AND DRYING MACHINE.

Application filed March 24, 1925, Serial No. 17,993, and in France December 31, 1924.

This invention relates to improvements in or connected with dish washing machines of the type described and shown in my prior application filed on December 24th, 1924, Serial Number 757,853.

The present improvements have for their purposes to enable the working of this machine in any place, without necessitating a main for supplying water under pressure, gas or electric current, and to provide an apparatus of very simple and inexpensive construction.

In the present case also, the rotary basket, which is arranged in such a manner that the plates to be washed are placed exactly like the paddles of an hydraulic turbine and like the wings of a centrifugal fan, works simultaneously or successively as an elevating hydraulic wheel and as a centrifugal fan. But this basket, suitably inclined, as hereinafter explained, instead of rotating under the action of water-jets, is directly actuated by hand, by means of a handle keyed upon its shaft, in such a manner that, in the course of its rotation, each plate becomes filled with washing water, which it elevates and, thereafter, allows to fall upon the other plates, when its inclination is sufficient. At the same time, the whole, working as a centrifugal fan, sucks air through a central opening and forces it outwards, together with the vapours and odours, through a peripheral nozzle. The cleansing and sterilizing by boiling water having been performed, the apparatus becomes merely a fan and insures, by an energetic centrifugal action and by an abundant ventilation, the very quick drying of the plates.

As hereinbefore stated, the basket, instead of being horizontal, must be more or less inclined in order to avoid the formation of a continuous water-sheet capable of taking a gyratory motion under the influence of the rotation. This arrangement enables a perfect washing with a very reduced quantity of water. It is also necessary that the plates be inclined relatively to the radii of the basket, in order that they may, even with a very small quantity of water in which they are only partially dipped, work as troughs that become filled with water, elevate it and allow it to fall, when, owing to their rotation, their inclination is changed.

The accompanying drawings illustrate, by way of example, a constructional form of this machine with an inclined basket.

Figure 1:
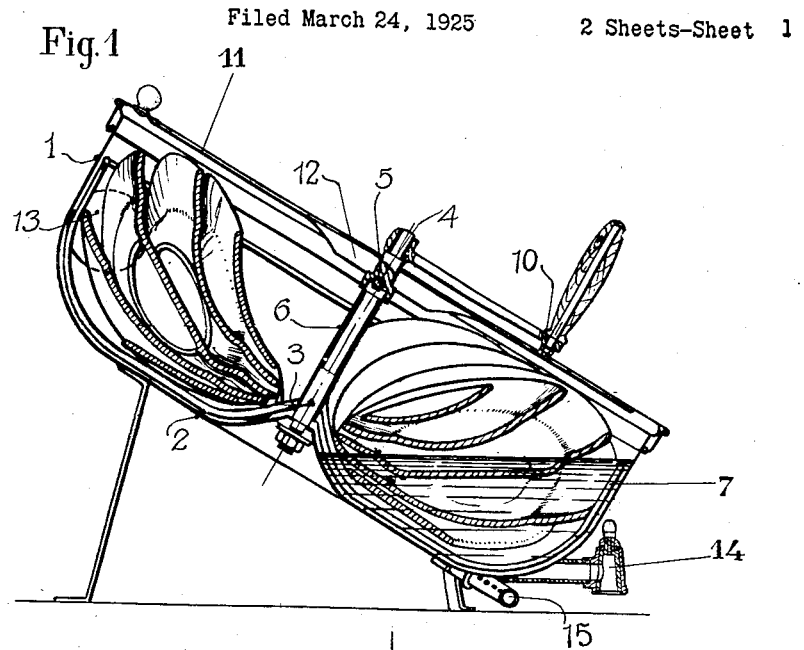
Figure 1 shows a section of the machine with an inclined basket.
Figure 2:
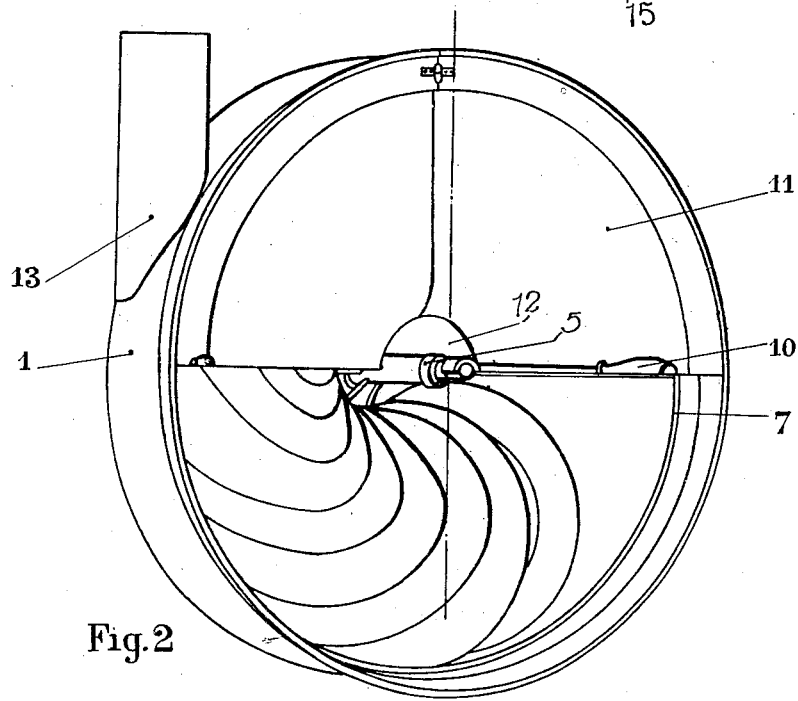
Figure 2 is a plan view of Figure 1.
Figure 3:
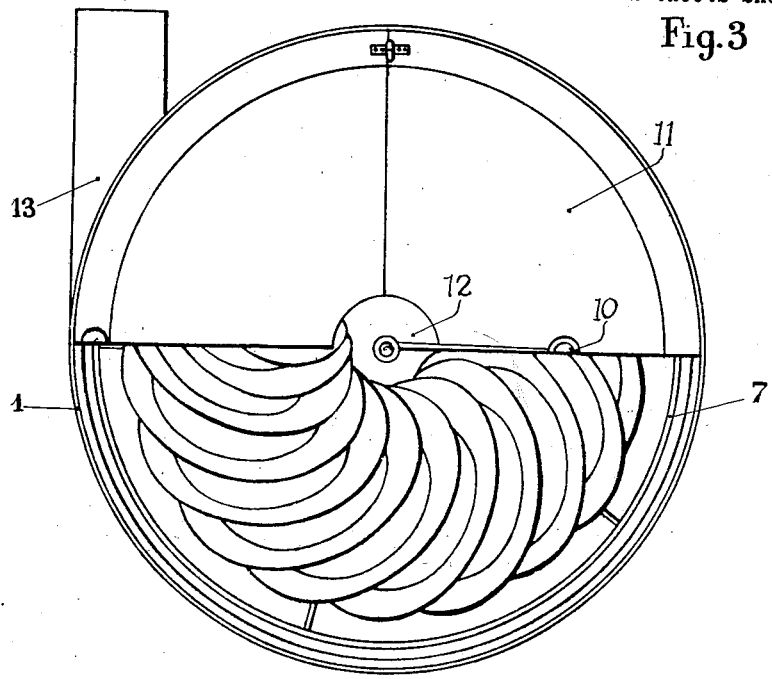
Figure 3 is a plan view showing the axis disposed vertically.
Figure 4:
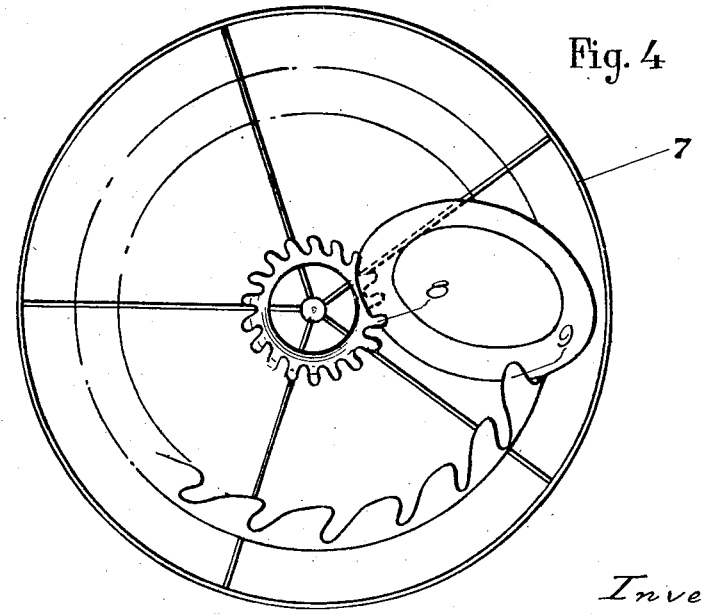
Figure 4 is a view of the basket with its notched crowns.

The improved machine is constituted by a cylindrical vat 1, the torus-shaped bottom 2 of which bears, at its center, a pivot 3 which carries at its upper end the ball 4, upon which rests the plug 5 of the tubular sleeve axis 6 of the basket 7.

A double crown with inclined notches 8 and 9 receives the plates to be washed which are placed therein exactly like the paddles of an hydraulic turbine. A handle 10 fastened to the end of the sleeve 6 of the basket enables the latter to be given a quick, rotary motion; this handle may, of course, be replaced by a pulley, in order to enable the apparatus to be driven by a belt actuated by a motor.

A cover 11, the upper half of which may be opened for inserting and withdrawing the plates, closes the vat; a central opening 12 provided in said cover allowing air to be sucked in by the rotary basket acting as a centrifugal fan. This air is forced out, together with the vapours and odours, through the lateral nozzle 13, which may be put in communication with the outside by any suitable funnel.

A drain-cock 14 enables the water contained in the vat to be drawn off therefrom, and a burner 15 allows this water to be heated directly in the apparatus.

In use, and after having placed the plates in the notches, the washing water is poured into the vat to such as extent as to immerse only the lower parts of the plates; the cover is then closed and the handle is rotated for a few moments. During this rotation, the lower part of each plate, dipping into the water, lifts this water sufficiently to fill with it the whole cavity of the plate; the rotation being continued, this water flows upon the parts of the plates which are not directly dipped into the washing water and insures their cleaning. It is thus possible to effect the washing of numerous plates with a very small quantity of water.

When the washing operation has been completed and the washing water discharged through the drain-cock, a small quantity of boiling water is poured into the apparatus, and the handle is again rotated for a few moments. In the course of these two washing and cleansing operations, the apparatus, working like a centrifugal fan, insures, as above stated, the forcing out of the vapours and odours.

After exhaustion of the cleansing water, it suffices to quickly rotate the handle again in order to insure the immediate centrifugal draining of the plates and the very rapid drying thereof by circulation of air between said plates which themselves form the wings of the fan.

Having now described my invention, what I claim is:

In a dish-washing machine, a tank having its axis inclined; and a dish support inside said tank mounted to rotate about an inclined axis coinciding with the tank axis, said dish support having means associated with it for holding dishes therein in a position such that each dish is inclined both to the axis of rotation and to the horizontal plane of the water level in the tank, whereby the successive dishes are caused to pick up and carry the water with them during their movement with the support and thereafter pour it upon the dishes below them.

In testimony whereof I have affixed my signature.

JULES-LOUIS BRETON.